(12) United States Patent
Filsfils et al.

(10) Patent No.: US 12,149,626 B1
(45) Date of Patent: Nov. 19, 2024

(54) APPLYING ATTESTATION TO BGP-LS

(71) Applicant: Cisco Technology, Inc., San Jose, CA (US)

(72) Inventors: Clarence Filsfils, Brussels (BE); Peter Psenak, Bratislava (SK); Ketan Jivan Talaulikar, Pune (IN); Paul W. Wells, Eden Prairie, MN (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 242 days.

(21) Appl. No.: 16/678,663

(22) Filed: Nov. 8, 2019

Related U.S. Application Data (60) Provisional application No. 62/829,468, filed on Apr. 4, 2019.

(51) Int. Cl.
| | | |
|---|---|---|
| *H04L 9/32* | (2006.01) | |
| *H04L 9/40* | (2022.01) | |
| *H04L 43/0811* | (2022.01) | |

(52) U.S. Cl.
CPC ........ *H04L 9/3234* (2013.01); *H04L 43/0811* (2013.01); *H04L 63/0209* (2013.01)

(58) Field of Classification Search
CPC ....... G06F 21/35; G06F 21/44; H04L 9/0861; H04L 9/0872; H04L 9/3271; H04L 9/3297; H04L 63/0492; H04L 63/061; H04L 2209/805; H04L 9/3234; H04L 43/0811; H04L 63/0209; H04W 4/80; H04W 12/0471
See application file for complete search history.

(56) References Cited

U.S. PATENT DOCUMENTS

| | | |
|---|---|---|
| 7,751,405 B1 | 7/2010 | Kompella |
| 7,920,558 B2 | 4/2011 | He |
| 8,155,000 B2 | 4/2012 | Vasseur |
| 9,161,227 B1 | 10/2015 | Bye et al. |
| 9,455,992 B2 | 9/2016 | Douceur et al. |
| 9,654,503 B1 | 5/2017 | Kowalyshyn |
| 9,762,583 B2 | 9/2017 | Guccione et al. |
| 10,015,132 B1 | 7/2018 | Qin et al. |
| 10,211,977 B1 * | 2/2019 | Roth .............. H04L 9/3234 |

(Continued)

FOREIGN PATENT DOCUMENTS

| | | |
|---|---|---|
| CN | 101834793 A | 9/2010 |
| CN | 107204941 A | 9/2017 |

(Continued)

OTHER PUBLICATIONS

"Border Gateway Protocol Link-State," *Border Gateway Protocol Link-State* https://www.cisco.com/c/en/us/td/docs/ios-xml/jos/iproute_bgp/configuration/xe-16/irg-xe-16-book/bgp-ls.pdf.

(Continued)

*Primary Examiner* — Piotr Poltorak
*Assistant Examiner* — Suman Debnath
(74) *Attorney, Agent, or Firm* — Baker Botts L.L.P.

(57) ABSTRACT

In one embodiment, a method by an apparatus of a Border Gateway Protocol-Link State (BGP-LS) environment includes receiving an attestation token from a first component and encoding the attestation token in a BGP-LS signaling message. The method further includes sending the BGP-LS signaling message with the encoded attestation token to a second component of the BGP-LS environment.

20 Claims, 9 Drawing Sheets

(56) References Cited

U.S. PATENT DOCUMENTS

| | | | |
|---|---|---|---|
| 10,298,488 B1 | 5/2019 | Wood et al. | |
| 10,594,592 B1 | 3/2020 | Wang | |
| 10,652,266 B1 | 5/2020 | Tautschnig et al. | |
| 10,735,197 B2 | 8/2020 | Sundaresan et al. | |
| 10,769,635 B2 | 9/2020 | Lindemann | |
| 2002/0012359 A1 | 1/2002 | Kikuchi et al. | |
| 2003/0120948 A1 | 6/2003 | Schmidt et al. | |
| 2005/0047412 A1 | 3/2005 | Hares | |
| 2005/0213768 A1 | 9/2005 | Durham et al. | |
| 2007/0008882 A1 | 1/2007 | Oran | |
| 2007/0028098 A1* | 2/2007 | Baartman | H04L 63/104 713/162 |
| 2007/0076599 A1 | 4/2007 | Ayyagari et al. | |
| 2007/0133406 A1 | 6/2007 | Vasseur | |
| 2007/0180495 A1 | 8/2007 | Hardjono et al. | |
| 2007/0192484 A1 | 8/2007 | Yamaoka et al. | |
| 2007/0297405 A1 | 12/2007 | He | |
| 2008/0101239 A1 | 5/2008 | Goode | |
| 2008/0170493 A1 | 7/2008 | Vasseur | |
| 2008/0225708 A1 | 9/2008 | Lange | |
| 2009/0086977 A1 | 4/2009 | Berggren | |
| 2009/0300707 A1* | 12/2009 | Garimella | H04L 63/20 726/1 |
| 2010/0238808 A1* | 9/2010 | Salam | H04L 41/0659 370/241.1 |
| 2012/0265984 A1* | 10/2012 | Ramanujan | H04L 63/08 713/156 |
| 2012/0290716 A1* | 11/2012 | Ogielski | H04L 43/04 709/224 |
| 2013/0239169 A1 | 9/2013 | Nakhjiri | |
| 2013/0345530 A1* | 12/2013 | McRoberts | H04L 63/08 600/323 |
| 2014/0029418 A1 | 1/2014 | Jain et al. | |
| 2014/0115325 A1 | 4/2014 | Detienne et al. | |
| 2015/0089568 A1* | 3/2015 | Sprague | H04L 63/0853 726/1 |
| 2015/0128223 A1 | 5/2015 | Magri et al. | |
| 2015/0249591 A1 | 9/2015 | Alvarez et al. | |
| 2015/0341428 A1 | 11/2015 | Chauhan | |
| 2015/0372901 A1 | 12/2015 | Pacella | |
| 2016/0072708 A1 | 3/2016 | Field | |
| 2016/0080502 A1 | 3/2016 | Yadav et al. | |
| 2016/0119821 A1 | 4/2016 | Ramachandran et al. | |
| 2016/0315819 A1 | 10/2016 | Dara et al. | |
| 2016/0323184 A1 | 11/2016 | Li et al. | |
| 2017/0026417 A1 | 1/2017 | Ermagan et al. | |
| 2017/0302459 A1* | 10/2017 | Fenner | H04L 9/0825 |
| 2017/0353430 A1* | 12/2017 | Holtmanns | H04L 67/145 |
| 2018/0041420 A1 | 2/2018 | Saad et al. | |
| 2018/0109450 A1 | 4/2018 | Filsfils et al. | |
| 2018/0324090 A1 | 11/2018 | Duncan et al. | |
| 2018/0367321 A1* | 12/2018 | Stammers | H04L 12/1407 |
| 2018/0367449 A1 | 12/2018 | Pani et al. | |
| 2019/0041829 A1* | 2/2019 | Sinha | G05B 19/4065 |
| 2019/0052705 A1 | 2/2019 | Giffin et al. | |
| 2019/0058709 A1 | 2/2019 | Kempf et al. | |
| 2019/0098676 A1 | 3/2019 | Svennebring | |
| 2019/0116038 A1* | 4/2019 | Sprague | H04L 9/3226 |
| 2019/0123999 A1* | 4/2019 | Chunduri | H04L 45/68 |
| 2019/0140850 A1 | 5/2019 | Ambrosin et al. | |
| 2019/0173750 A1 | 6/2019 | Shaikh et al. | |
| 2020/0084132 A1 | 3/2020 | Chauhan | |
| 2020/0084202 A1* | 3/2020 | Smith | H04L 41/5003 |
| 2020/0153627 A1 | 5/2020 | Wentz | |
| 2020/0160320 A1 | 5/2020 | Williams et al. | |
| 2020/0287888 A1 | 9/2020 | Moore et al. | |
| 2020/0296025 A1 | 9/2020 | Wang | |
| 2020/0322312 A1 | 10/2020 | Psenak et al. | |
| 2021/0083973 A1 | 3/2021 | Peng et al. | |
| 2021/0160056 A1 | 5/2021 | Yan | |
| 2021/0297406 A1* | 9/2021 | Landers | H04L 63/0853 |
| 2021/0377173 A1 | 12/2021 | Zhang et al. | |

FOREIGN PATENT DOCUMENTS

| | | |
|---|---|---|
| CN | 105591811 B | 8/2019 |
| CN | 110650075 A | 1/2020 |
| DE | 60109809 T2 | 3/2006 |
| EP | 1732268 A1 | 12/2006 |
| EP | 2698961 B1 | 12/2014 |
| JP | 2004228817 A | 8/2004 |
| JP | 2004260567 A | 9/2004 |
| JP | 2015173378 A | 10/2015 |
| WO | 2011103781 A2 | 9/2011 |
| WO | 2012028409 A1 | 3/2012 |

OTHER PUBLICATIONS

Gredler, et al., "North-Bound Distribution of Link-State and Traffic Engineering (TE) Information Using BGP," *Internet Engineering Task Force (IETF)* https://tools.ietf.org/html/rfc7752.

"SDN Workshop," *APNIC*, WSDN01_v0.1. https://wiki.apnictraining.net/_media/apnic46-sdn/wsdn01_-_module_4_-_bgp-ls_-_v1.0.pdf.

Diptanshu Singh, "Yet Another new BGP NLRI:BGP-LS," https://packetpushers.net/yet-another-new-bgp-nlri-bgp-ls/.

"IP Routing: BGP Configuration Guide," updated Feb. 13, 2017. https://www.cisco.com/c/en/us/td/docs/ios-xml/ios/iproute_bgp/configuration/xe-16/irg-xe-16-book/irg-xe-16-book_chapter_01010101.html.

Toni R. Farley, et al., "A Survey of BGP Security Issues and Solutions," *IEEE/ACM Transactions on Networking*.

Michael J. Ham, "BGP Route Attestation: Design and Obsrvaction Using IPV6," Dakota State Univeristy, Beadle Scholar, Masters Theses & Doctoral Dissertations.

Stephen T. Kent, "Securing the Border Gateway Protocol," *The Internet Protocol Journal*.

Adnan A., et al., "A Trust Aware Routing Protocol For Energy Constrained Wireless Sensor Network," Telecommunication Systems, Baltzer Science Publishers, Basel, Ch, Jun. 10, 2015, vol. 61, No. 1, pp. 123-140, DOI: 10.1007/s11235-015-0068-8, ISSN 1018-4864, XP035595336.

Andersson L., et al., "LDF Specification," Network Working Group, Oct. 2007, 135 Pages.

Awduche D.O., et al., "RSVP-TE: Extensions to RSVP for LSP Tunnels," Network Working Group, Request for Comments 3209, Dec. 2001, pp. 1-61.

Baker F., et al., "RSVP Cryptographic Authentication," RFC 2747, Jan. 2000, 21 Pages.

Bashandy A., et al., "Segment Routing with the MPLS Data Plane," RFC 8660, Dec. 6, 2019, The Internet Society, Reston, VA, USA, 29 pages.

Berger L., et al., "RSVP Extensions for IPSEC Data Flows," RFC2207, Sep. 1997, 14 Pages.

Braden R., et al., "Resource Reservation Protocol (RSVP)—Version 1 Functional Specification," RFC 2205, The Internet Society, Reston, VA, USA, Sep. 1997, pp. 1-112.

Camtepe S.A., et al., "Kerberos Based Security System for Session Initiation Protocol," 1996, 150 Pages.

Clad F., Ed., et al., "Service Programming with Segment Routing, draft-ietf-spring-sr-service-programming-01," Nov. 4, 2019, 32 Pages.

Clad F., et al., "Service Programming with Segment Routing, draft-xuclad-spring-sr-service-programming-00," Jul. 2, 2018, 30 Pages.

Deering S., et al., "Internet Protocol, Version 6 (IPv6) Specification," RFC 8200, Jul. 2017, The Internet Society, Reston, VA, USA, 42 pages.

Durand J., et al., "BGP Operations and Security, rfc7454.txt," Internet Engineering Task Force (IETF), Standard, Internet Society (ISOC) 4, Rue Des Falaises CH-1205 Geneva, Switzerland, Feb. 18, 2015, pp. 1-26, XP015104552.

Farinacci D., et al., LISP Canonical Address Format (LCAF), Feb. 2017, 36 Pages, Retrieved from URL: https://tools.ietf.org/html/rfc8060.

(56) References Cited

OTHER PUBLICATIONS

Farinacci D., et al., "LISP Data-Plane Confidentiality," draft-ietf-lisp-crypto-10, Oct. 14, 2016, 21 Pages, Retrieved from URL: https://tools.ietf.org/html/draft-ietf-lisp-crypto-10.

Fuchs A., et al., "Time-Based Uni-Directional Attestation: draft-birkholz-rats-tuda-00," Network Working Group, Mar. 12, 2019, pp. 1-68.

Fuller V., et al., "Locator/ID Seperation Protocol (LISP) Control-Plane," draft-ietf-lisp-rfc6833bis-24, Feb. 4, 2019, 62 Pages, Retrieved from URL: https://tools.ietf.org/html/draft-ietf-lisp-rfc6833bis-24.

Gao B., "Implementation and Validation of the General Internet Signaling Transport Protocol," Apr. 2008, 117 Pages.

International Preliminary Report on Patentability for International Application No. PCT/US2020/026358, mailed Oct. 14, 2021, 08 Pages.

International Preliminary Report on Patentability for International Application No. PCT/US2020/026375, mailed Oct. 14, 2021, 08 Pages.

International Preliminary Report on Patentability for International Application No. PCT/US2020/026385, mailed Oct. 14, 2021,14 Pages.

International Preliminary Report on Patentability for International Application No. PCT/US2020/026499, mailed Oct. 14, 2021, 08 Pages.

International Preliminary Report on Patentability for International Application No. PCT/US2020/026507, mailed Oct. 14, 2021, 09 Pages.

International Search Report and Written Opinion for International Application No. PCT/US2020/026358, mailed Jul. 21, 2020, 08 Pages.

International Search Report and Written Opinion for International Application No. PCT/US2020/026375, mailed Jul. 23, 2020, 09 Pages.

International Search Report and Written Opinion for International Application No. PCT/US2020/026499, mailed Jul. 21, 2020, 13 Pages.

International Search Report and Written Opinion for International Application No. PCT/US2020/026507, mailed Jul. 21, 2020, 11 Pages.

Katz D., et al., "Bidirectional Forwarding Detection (BFD)", Internet Engineering Task Force (IETF), Jun. 2010, pp. 1-49.

Kent S., et al., "Threat Model for BGP Path Security," Internet Engineering Task Force (IETF), RFC: 7132, Standard, Internet Society (ISOC) 4, Rue Des Falaises CH-1205 Geneva, Switzerland, Feb. 22, 2014, pp. 1-20, XP015100576.

Kim P., "Resource Reservation in Shared and Switched Demand Priority Local Area Networks," Sep. 1998, 24 pages.

Lepinski M., et al., "An Infrastructure to Support Secure Internet Routing, draft-ietf-sidr-arch-11.txt," Internet Engineering Task Force(IETF), Standard Working Draft, Internet Society (ISOC) 4, Rue Des Falaises CH-1205 Geneva, Switzerland, Sep. 21, 2010, No. 11, pp. 1-25, XP015071244.

Li Q., et al., "Enhancing the Trust of Internet Routing with Lightweight Route Attestation," IEEE Transactions on Information Forensics and Security, Piscataway, NJ, US, Apr. 1, 2012, vol. 7, No. 2, pp. 691-703, DOI: 10.1109/TIFS.2011.2177822, ISSN 1556-6013, XP011433682.

Maino F., et al., LISP-Security (LISP-SEC), draft-ietf-lisp-sec-17, Nov. 9, 2019, 23 Pages, Retrieved from URL: https://tools.ietf.org/html/draft-ietf-lisp-sec-17.

Mankin A., Ed., et al., "Resource Reservation Protocol (RSVP)—Version 1 Applicability Statement Some Guidelines on Deployment," RFC 2208, Sep. 1997, 19 Pages.

Mota R., "Segment Routing," ACG Research Paper, 2018, 28 Pages.

Partial Search Report for International Application No. PCT/US2020/02635, mailed Jul. 16, 2020, 15 Pages.

Patent Cooperation Treaty, International Search Report and Written Opinion for International Application No. PCT/US2020/026385, mailed Sep. 7, 2020, 22 Pages.

Rosen E., etaL, "MPLS Label Stack Encoding," Network Working Group, RFC 3032, Jan. 2001, pp. 1-23.

Sagara K., et al., "A Distributed Authentication Platform Architecture For Peer-to-peer Applications," IEICE Transactions on Communications, Communications Society, Tokyo, JP, Mar. 1, 2005, vol. E88-B, No. 3, pp. 865-872, DOI:10.1093/ietcom/e88-b.3.865, ISSN 0916-8516, XP001225562.

Shoneman D.T, et al., "Endpoint Trust-based Traffic Management," ip.Com, ip.com Incorporated, Oct. 31, 2017, 13 Pages, West Henrietta, NY, US, ISSN 1533-0001, XP013176242.

TCG Public Review: "TCG Guidance for Securing Network Equipment Using TCG Technology," Version 1.0, Revision 29, Jan. 17, 2018, 58 pages.

Trusted Computing Group: "TCG Guidance for Securing Network Equipment," Jan. 17, 2018, 2 Pages, Retrieved from URL: https://trustedcomputinggroup.org/resource/tcg-guidance-securing-network-equipment/.

Wang B., et al., "A light-weight trust-based QoS Routing Algorithm for Ad Hoc Networks," Pervasive and Mobile Computing, NL, Jun. 26, 2013, vol. 13, pp. 164-180, DOI: 10.1016/j.pmcj.2013.06.004, ISSN 1574-1192, XP055712411.

Wei Y., et al., "Analysis of Resource Reservation Protocol-Traffic Engineering (RSVP-TE) Security According to KARP Design Guide," draft-wei-karp-rsvp-te-analysis-00.txt, ZTE Corporation, Southeast University, Internet Engineering Task Force (IEFT), Standard Working Draft, Internet Society (ISOC) 4, Rue Des F, Jul. 27, 2011, pp. 1-8, XP015077504.

Office Action for European Application No. 20722759.6, dated Apr. 11, 2024, 5 Pages.

\* cited by examiner

| TLV-Type |
|---|
| Length |
| Value |
| To be allocated by IANA |
| Variable |
| Structured information including the attestation parameters and token |

| TLV-Type |
|---|
| Length |
| Value |
| To be allocated by IANA |
| Variable |
| Security Level (1 byte) |

APPLYING ATTESTATION TO BGP-LS

PRIORITY

This application claims the benefit, under 35 U.S.C. § 119(e), of U.S. Provisional Patent Application No. 62/829,468, filed 4 Apr. 2019, which is incorporated herein by reference in its entirety.

TECHNICAL FIELD

The present disclosure relates generally to data communications, and more particularly to applying attestation to the Border Gateway Protocol-Link State (BGP-LS) routing protocol.

BACKGROUND

In a network, information may be transmitted through one or more network nodes before arriving at its destination. Certain network nodes may be become compromised. For example, an attacker may gain control of a node and direct traffic from the node to the attacker's computing device. In the event the attacker gains access to one or more network nodes, the attacker may tamper with the sensitive information transmitted through the compromised node.

DESCRIPTION OF EXAMPLE EMBODIMENTS

Overview

In a communications network, information may be transmitted through one or more network nodes before arriving at its destination. In some networks, the Border Gateway Protocol-Link State (BGP-LS) routing protocol is utilized between certain network nodes to transmit information about the network. More specifically, BGP-LS is used to deliver network topology information to other devices in the network such as topology servers, Application Layer Traffic Optimization (ALTO) servers, and Path Computation Elements (PCEs). The topology information is generated and transmitted using BGP-LS via one or more BGP-LS speakers in the network.

In some situations, certain network nodes in a BGP-LS environment may become compromised. For example, an attacker may gain control of a node and direct traffic from the node to the attacker's computing device. In the event the attacker gains access to one or more network nodes, the attacker may tamper with the sensitive information transmitted through the compromised node.

EXAMPLE EMBODIMENTS

To address these and other problems in networks that utilize BGP-LS, embodiments of the disclosure provide apparatuses, systems, methods, and computer-readable media for applying attestation to BGP-LS. In some embodiments, the attestation that is applied to BGP-LS includes a token which may allow external entities to validate freshness of asserted data based on the state of internal counters within a Trusted Platform Module (TPM). The token or signed measurement may be referred as a canary stamp (or simply "Stamp") since a token or signed measurement may provide authenticity similar to a stamp and may be used as an early indicator of trouble. In some embodiments, the attestation is applied to BGP-LS using two new Type/Length/Value (TLV) triplets: an attestation-capability TLV and a security-level TLV. The attestation-capability TLV may be included in a BGP-LS Attribute associated with a Node Network Layer Reachability Information (NLRI). The security-level TLV may be included in a BGP-LS Attribute associated with all Link-State NLRIs. In both cases, the TLVs may be transmitted to other network entities via a BGP-LS signaling message such as a BGP-LS Update message.

Figure 1:
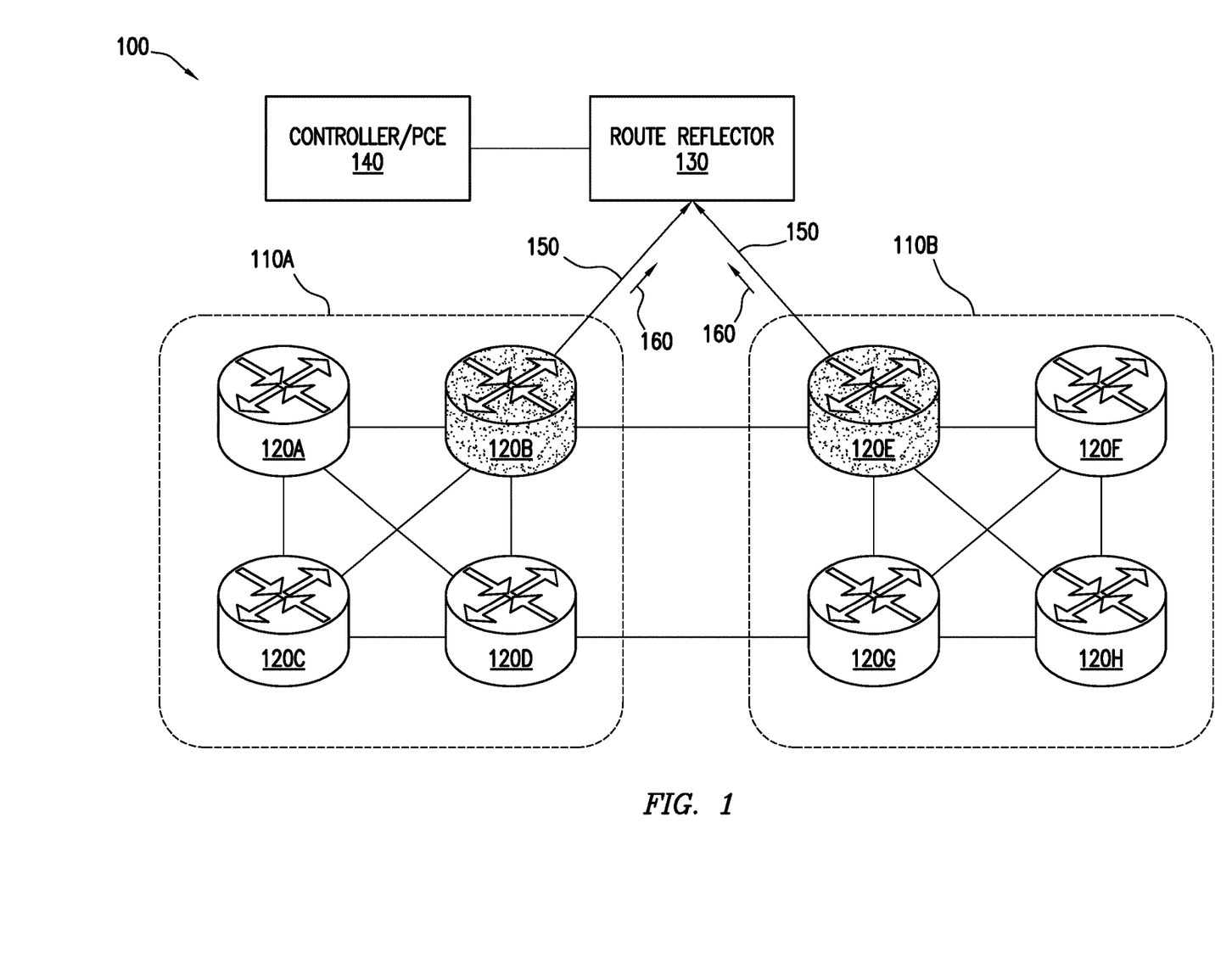
FIG. 1 illustrates a network utilizing a Border Gateway Protocol-Link State (BGP-LS) routing protocol.
Figure 2:
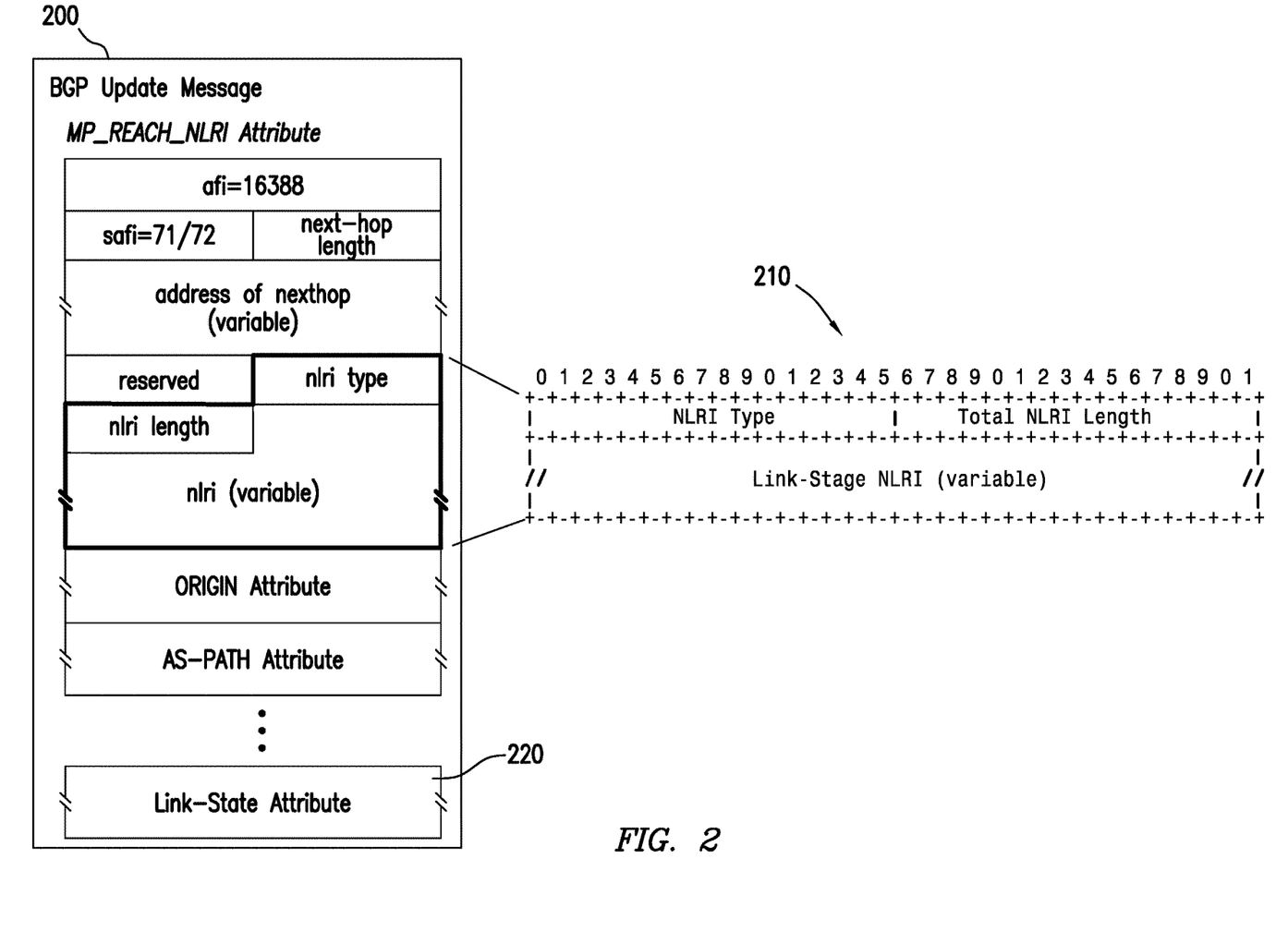
FIG. 2 illustrates an example BGP Update message that includes a Link-State Network Layer Reachability Information (NLRI).
Figure 3:
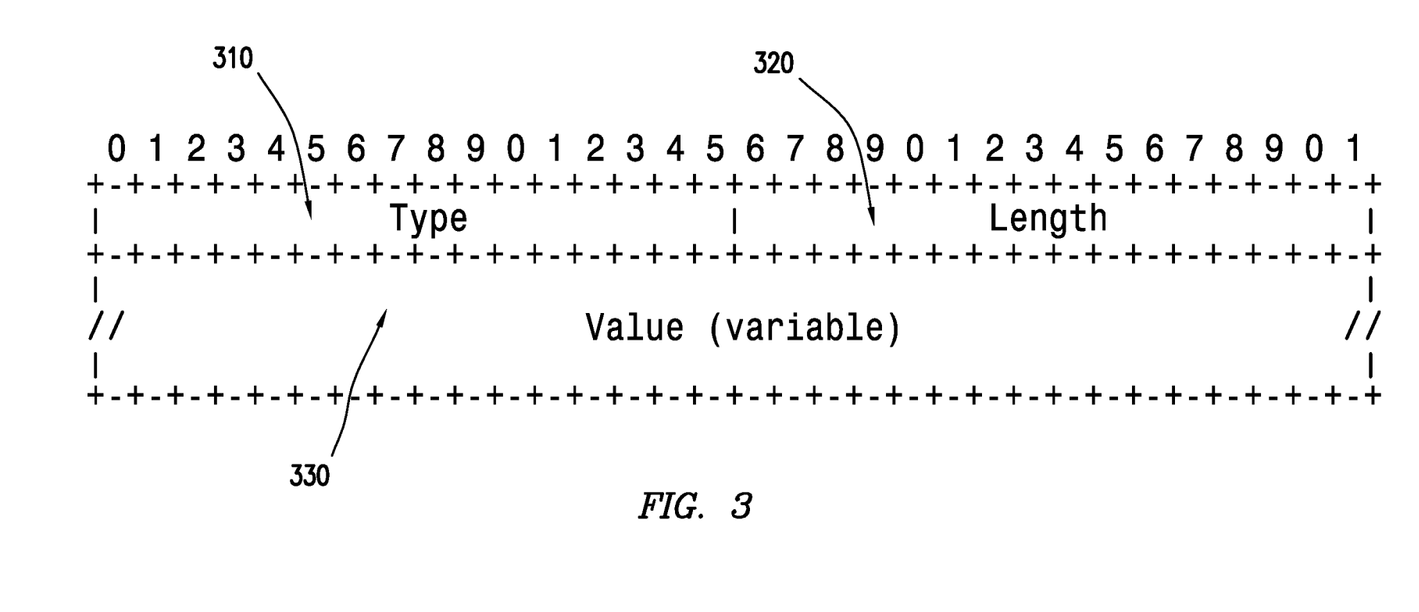
FIG. 3 illustrates an example Type/Length/Value (TLV) triplet format used in the BGP Update message of FIG. 2.
Figure 4:
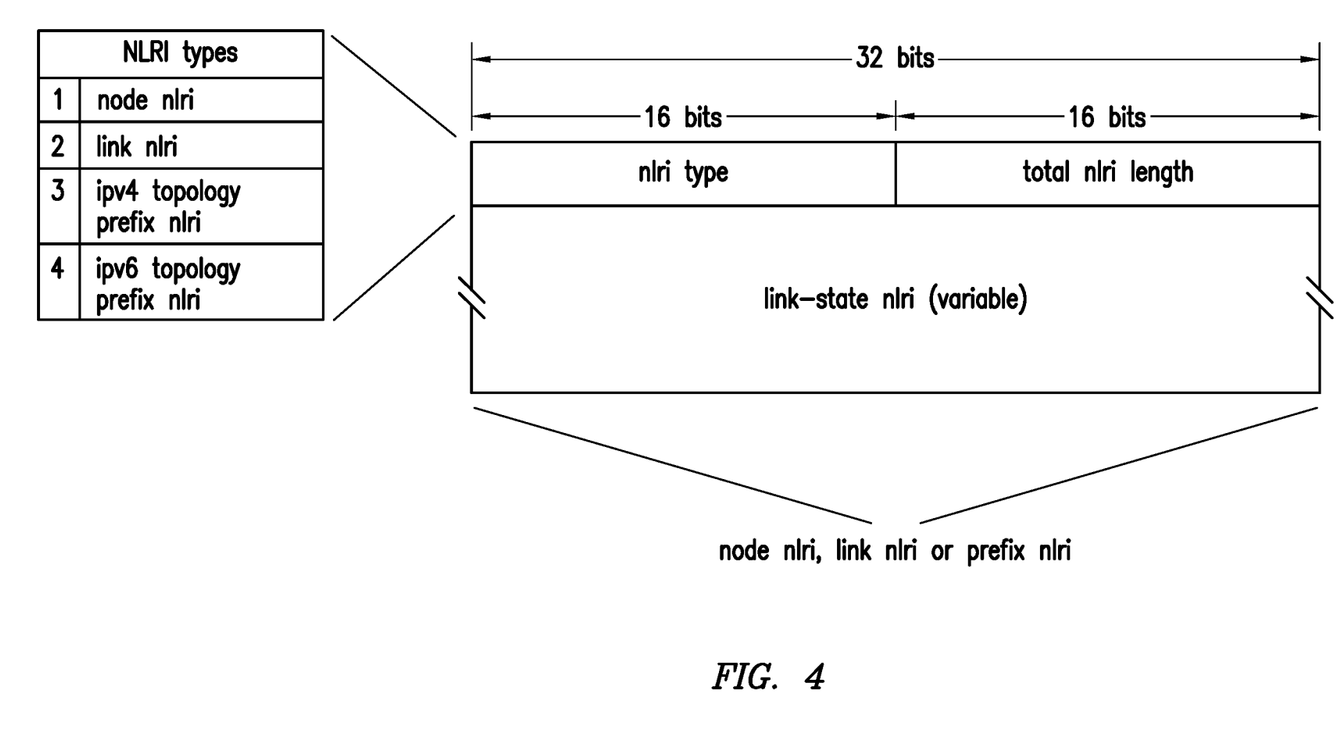
FIG. 4 illustrates NLRI Types of the Link-State NLRI of FIG. 2.
Figure 5:
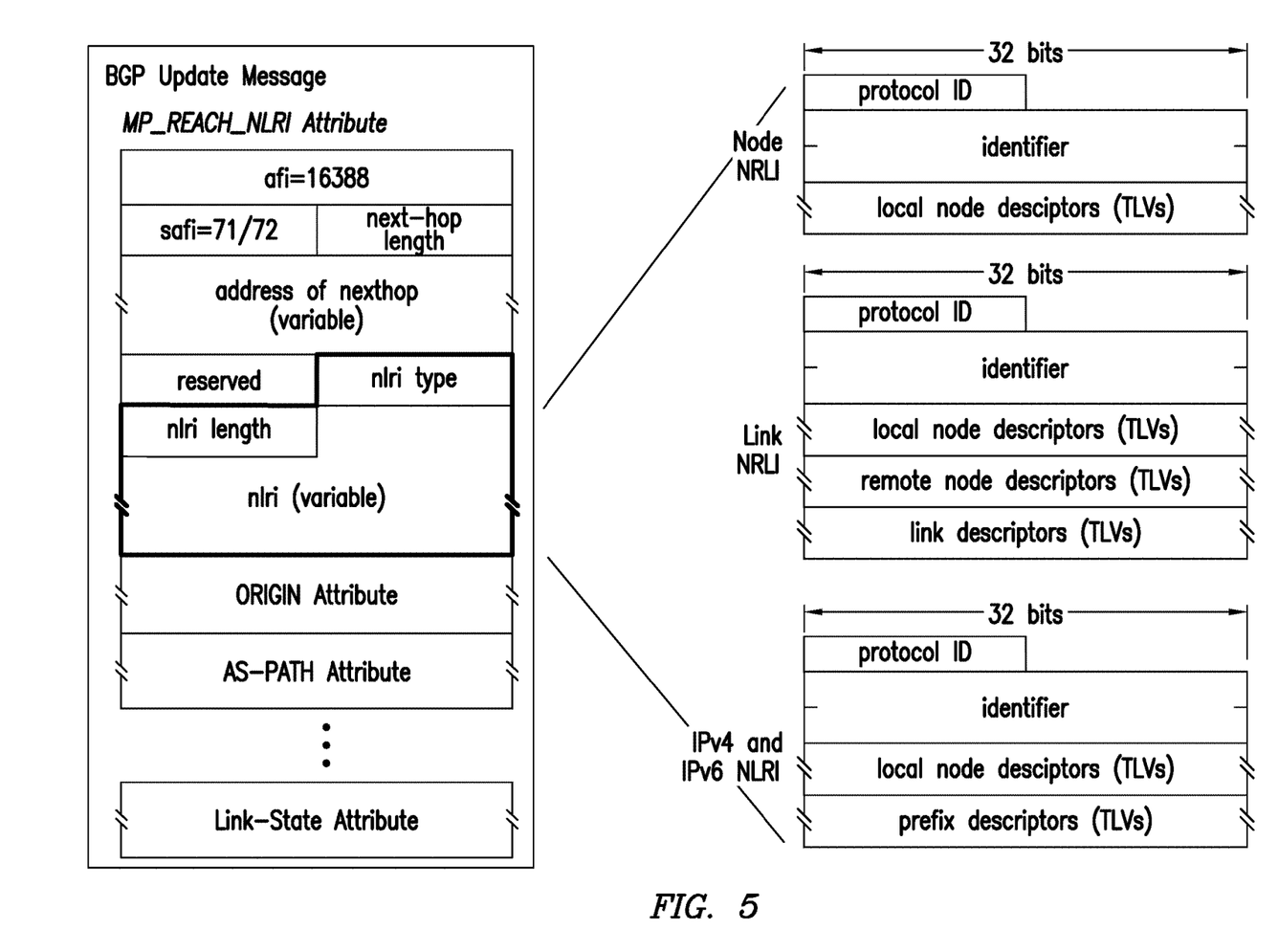
FIG. 5 illustrates various NLRI formats of the Link-State NLRI of FIG. 2.
Figure 6:
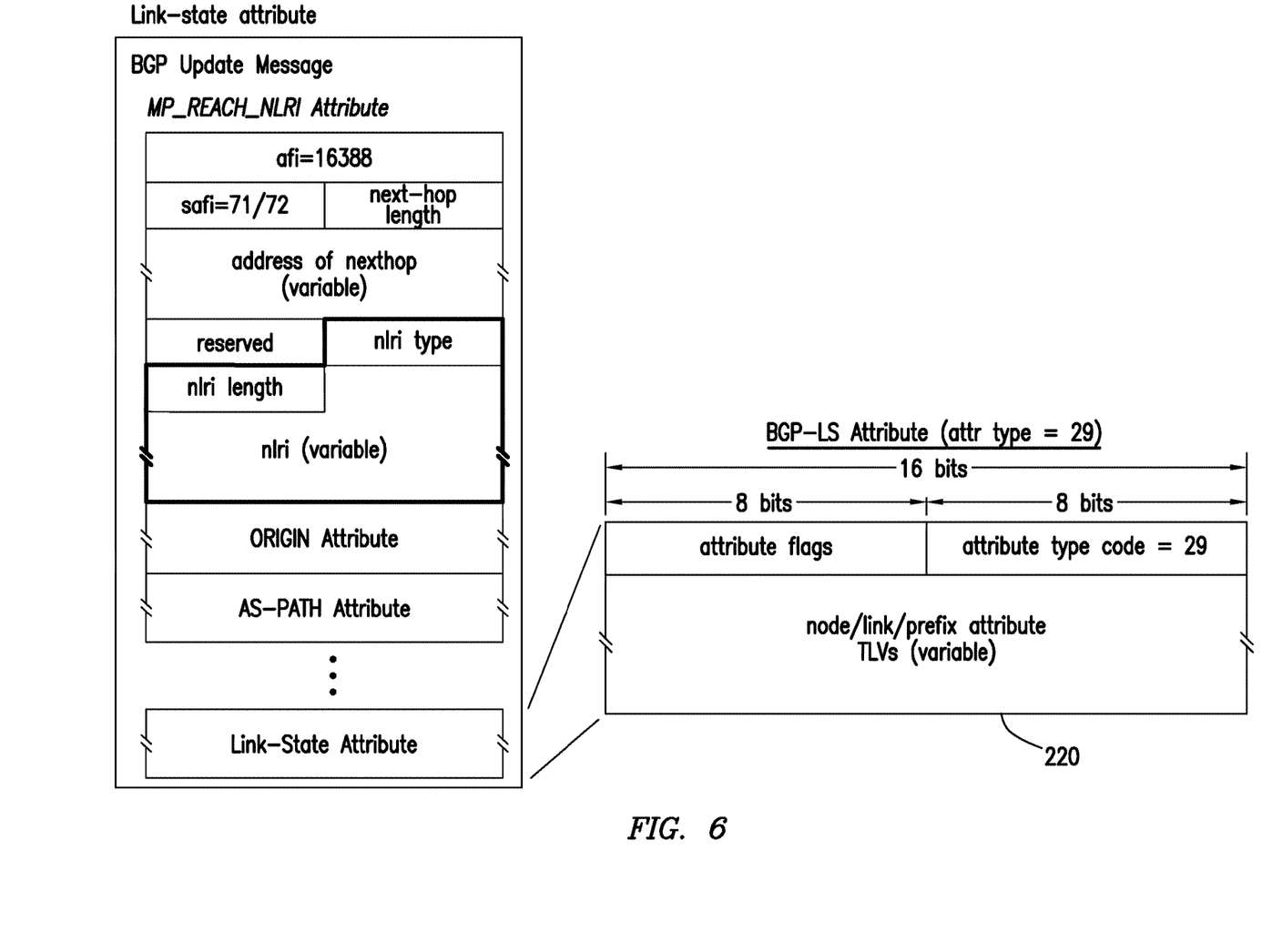
FIG. 6 illustrates a Link-State Attribute format of the BGP Update message of FIG. 2.
Figure 7A:
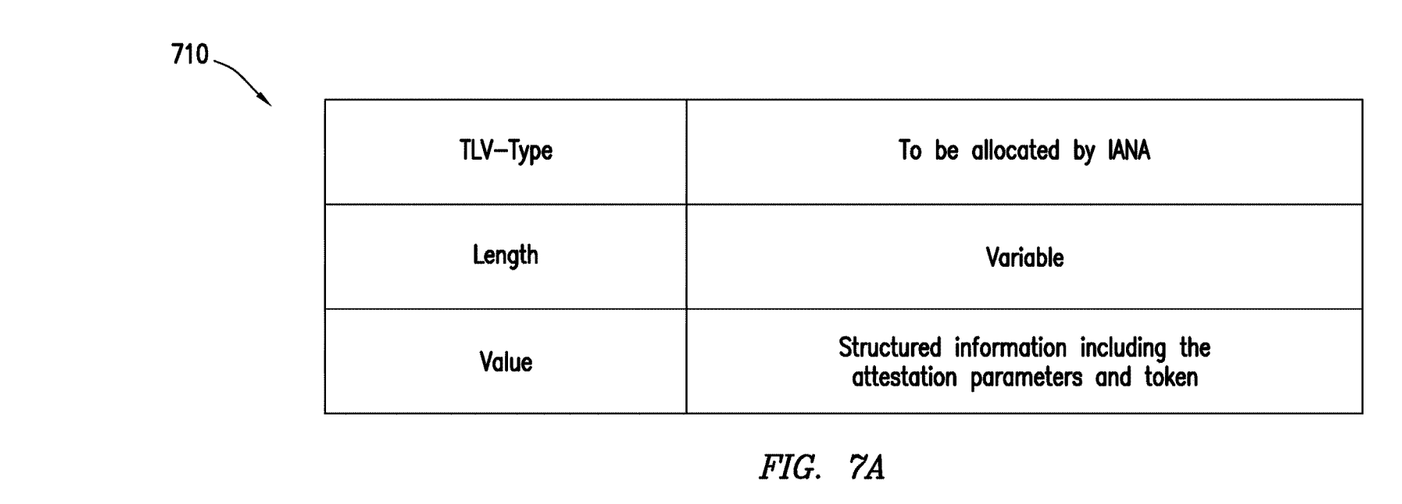
FIG. 7A illustrates an attestation-capability TLV used to apply attestation to BGP-LS.
Figure 7B:
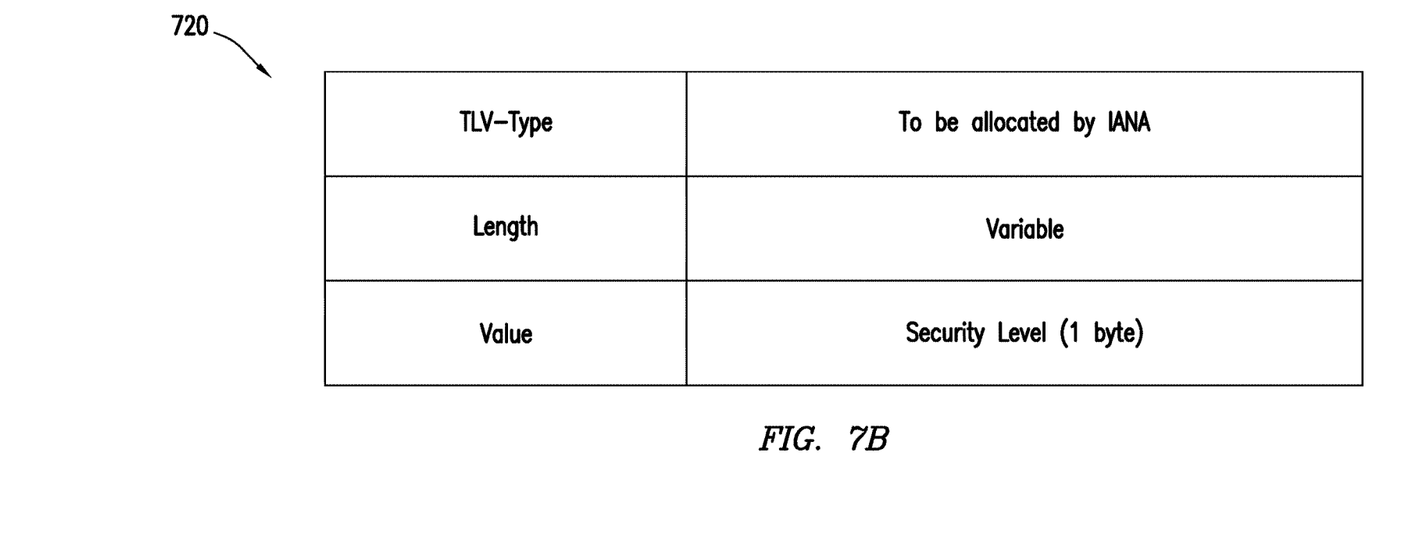
FIG. 7B illustrates a security-level TLV used to apply attestation to BGP-LS.
Figure 8:
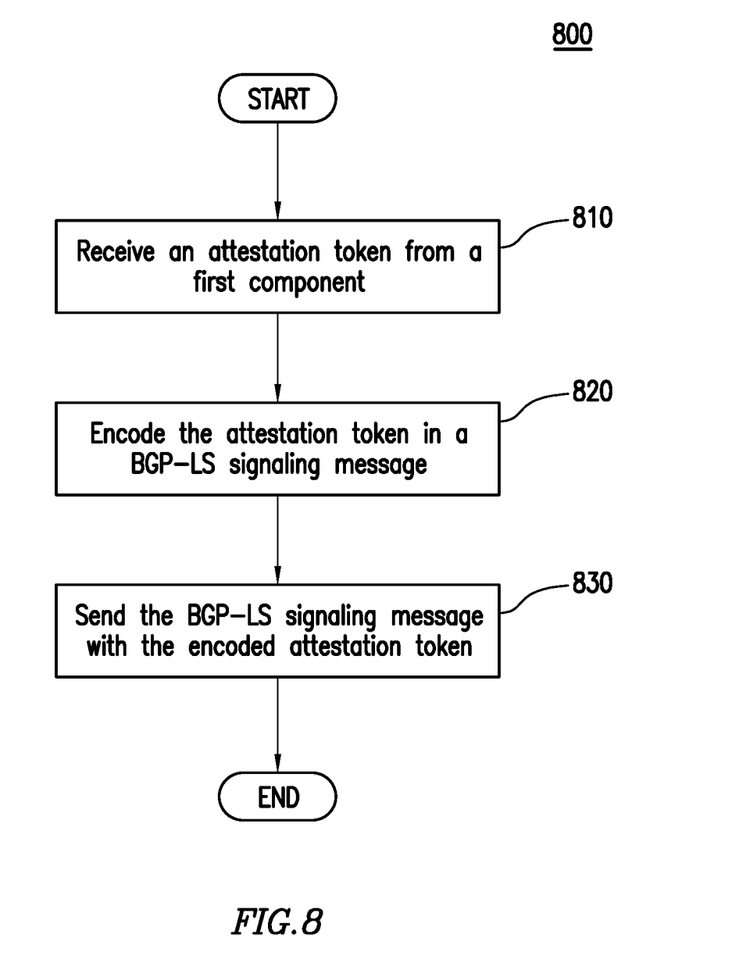
FIG. 8 illustrates an example method for applying attestation to the BGP-LS routing protocol.
Figure 9:
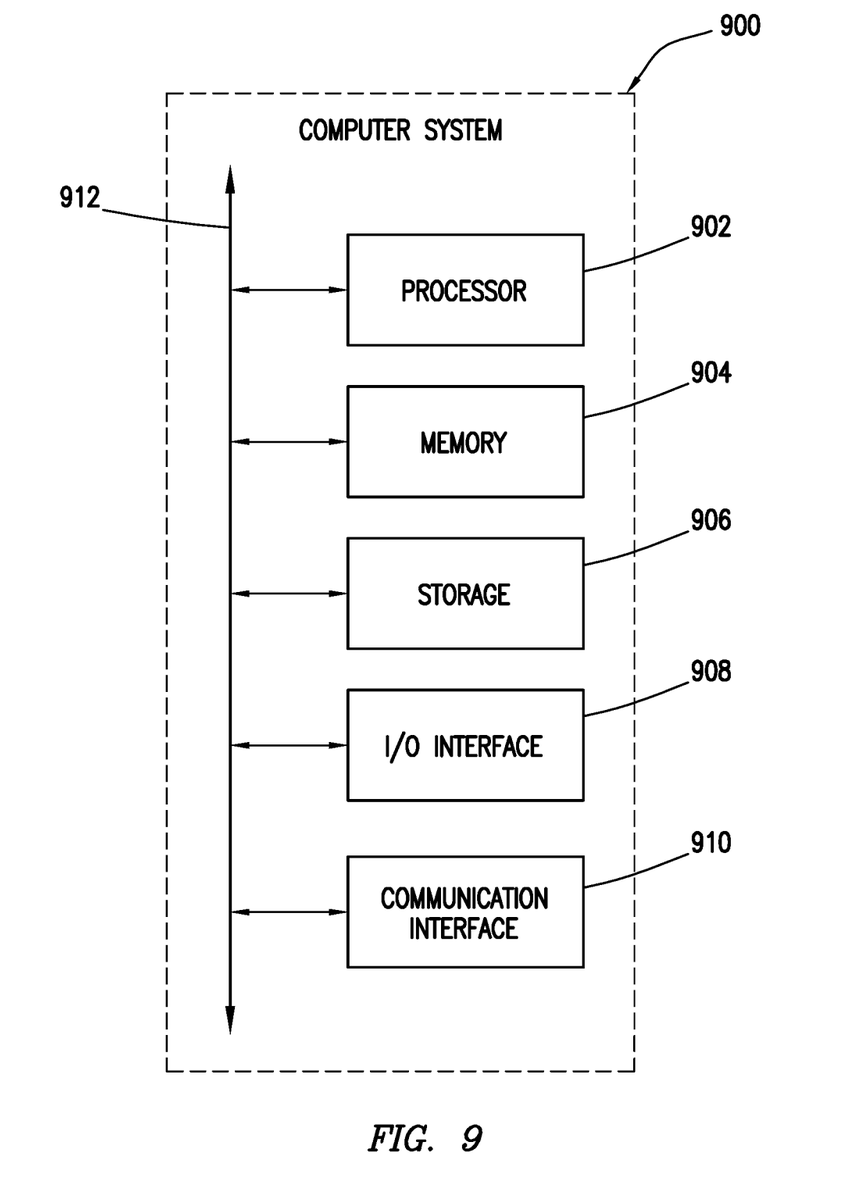
FIG. 9 illustrates an example computer system.

The advantages and features of certain embodiments are discussed in more detail below in reference to FIGS. 1-9. FIG. 1 illustrates a network utilizing a BGP-LS routing protocol. FIG. 2 illustrates an example BGP Update message that includes a Link-State NLRI. FIG. 3 illustrates an example TLV triplet format used in the BGP Update message of FIG. 2. FIG. 4 illustrates NLRI Types of the Link-State NLRI of FIG. 2. FIG. 5 illustrates various NLRI formats of the Link-State NLRI of FIG. 2. FIG. 6 illustrates a Link-State Attribute format of the BGP Update message of FIG. 2. FIG. 7A illustrates an attestation-capability TLV used to apply attestation to BGP-LS. FIG. 7B illustrates a security-level TLV used to apply attestation to BGP-LS. FIG. 8 illustrates an example method for applying attestation to the BGP-LS routing protocol. FIG. 9 illustrates an example computer system.

FIG. 1 illustrates a network 100 that utilizes a BGP-LS routing protocol, according to certain embodiments. In some embodiments, network 100 includes multiple sub-networks 110 (e.g., 110A and 110B). Each sub-network 110 may be, for example, an interior gateway protocol (IGP) network. Each sub-network 110 includes one or more network elements 120 (e.g., 120A-120H). Network elements 120 may be any appropriate network device or node such as a network router. In each sub-network, at least one network element 120 may be configured as a BGP-LS speaker. For example, in the illustrated network 100 of FIG. 1, network elements 120B and 120E are each configured to function as a BGP-LS speaker. Each BGP-LS speaker communicates link-state and traffic engineering information to an external network component 130 such as a route reflector (RR) via a BGP-LS link 150. External network component 130 obtains the link-state and traffic engineering information from sub-networks 110 via BGP-LS links 150. Another external component 140 (e.g., a controller) may then collect the link-state and traffic engineering information in the "northbound" direction across sub-networks 110 and construct the end-to-end path (with its associated SIDs) that need to be applied to an incoming packet to achieve a desired end-to-end forwarding.

As discussed in more detail below, BGP-LS speakers (e.g., network elements 120B and 120E in FIG. 1) apply an attestation 160 to information transmitted on BGP-LS links 150. Attestation 160 provides verifiable evidence of the trustworthiness of network elements 120, thereby enabling external devices such as 130 and 140 to ascertain if any network element 120 has been compromised (e.g., hacked or captured). This increases the security of network 100 and reduces or eliminates the possibility of sensitive information being stolen.

In general, BGP-LS is an Address Family Identifier (AFI) and Sub-address Family Identifier (SAFI) defined to carry IGP link-state databases through BGP. BGP-LS delivers network topology information to external network component 130 such topology servers, Application Layer Traffic Optimization (ALTO) servers, Path Computation Elements (PCEs), and RRs. BGP-LS allows policy-based control to aggregation, information-hiding, and abstraction. BGP-LS supports Intermediate System to Intermediate System (IS-IS) and Open Shortest Path First (OSPF) routing protocols.

BGP-LS provides link-state traffic engineering information from IGPs to external components using BGP-LS signaling messages. In some embodiments, link-state information is encoded within a BGP Update message using a BGP Network Layer Reachability Information (NLRI) encoding format. This mechanism is applicable to both physical and virtual links. For example, FIG. 2 illustrates an example BGP Update message 200 that includes a Link-State NLRI 210. BGP Update message 200 may also include a BGP-LS Attribute 220. BGP-LS Attribute 220 is described in more detail below in reference to FIG. 6.

Link-State NLRI 210 and other information within BGP Update message 200 is encoded in TLV triplets. The TLV format is shown in FIG. 3. The TLV format includes a Type field 310, a Length field 320, and a Value field 330. Type field 310 is typically a binary code that indicates the kind of field that this part of the message represents. In many cases, the Type code for each type of TLV may be assigned by the Internet Assigned Numbers Authority (IANA) for interoperability. Length field 320 defines the length of Value field 320 in octets. TLVs allow the BGP-LS routing protocol to be extendable. TLVs may also include nested TLVs or sub-TLVs. The TLV may be used to carry a variety of types of information. In particular embodiments, a canary stamp may be embodied in the BGP-LS routing protocol as an attestation-focused TLV, as discussed in more detail below.

The Value field of Link-State NLRI 210 indicates the type of NLRI of Link-State NLRI 210. FIG. 4 illustrates various possible NLRI Types of Link-State NLRI 210. A value of "1" in the Value field of Link-State NLRI 210 indicates that Link-State NLRI 210 is a node NLRI. A value of "2" in the Value field of Link-State NLRI 210 indicates that Link-State NLRI 210 is a link NLRI. A value of "3" in the Value field of Link-State NLRI 210 indicates that Link-State NLRI 210 is an IPV4 NLRI. A value of "4" in the Value field of Link-State NLRI 210 indicates that Link-State NLRI 210 is an IPV6 NLRI. Examples of a node NLRI, link NLRI, IPv4 NLRI, and IPV6 NLRI are illustrated in FIG. 5.

The identifying key of each Link-State object, namely a node, link, or prefix, is encoded in the NLRI and the properties of the object are encoded in BGP-LS attribute 220. An example BGP-LS attribute 220 is illustrated in FIG. 6. BGP-LS attribute 220 is an non-transitive BGP attribute that is used to carry link, node, and prefix parameters and attributes. It is defined as a set of TLV triplets as discussed above. BGP-LS attribute 220 includes attribute flags (8 bits), an attribute type code (8 bits), and link, node, and prefix parameters and attributes encoded as TLVs (variable length).

FIGS. 7A and 7B illustrate novel TLVs that may be used to apply attestation to BGP-LS. FIG. 7A illustrates an attestation-capability TLV 710, and FIG. 7B illustrates a security-level TLV 720, according to certain embodiments. Attestation-capability TLV 710 is included in BGP-LS Attribute 220 associated with the Node NLRI. Attestation-capability TLV 710 may be a top-level BGP-LS TLV in the hierarchy of TLVs. The TLV-type of attestation-capability TLV 710 may be any appropriate value allocated by IANA. The length of attestation-capability TLV 710 may be variable. The value of attestation-capability TLV 710 may include structured information including attestation parameters supported by the node and an attestation token (e.g., a canary stamp) generated using a TPM of a network node (e.g., a network element 120), as described in more detail below. Security-level TLV 720 is a new TLV that is included in the BGP-LS Attribute 220 associated with all Link-State NLRI types. Security-level TLV 720 may be a sub-TLV, in some embodiments. The TLV-type of security-level TLV 720 may be any appropriate value allocated by IANA. The length of security-level TLV 720 may be variable. The value of security-level TLV 720 may include one byte of the security level of an indicated network element 120 and optional sub-TLVs.

In general, attestation-capability TLV 710 and security-level TLV 720 are utilized by network elements 120 (e.g., a BGP-LS speaker network element 120) to apply attestation to BGP-LS. In some embodiments, the attestation that is applied to BGP-LS includes a token which may allow external entities to validate freshness of asserted data based on the state of internal counters within a TPM. In some embodiments, the attestation is provided by a TMP. Dedicated crypto-processors, such as a TPM, may take measurements necessary to attest the identity of a device and running binaries on the device. These measurements may include evidence that the device is in a known safe state. However, a receiver must be able to certify the evidence as fresh. Without a guarantee of freshness, an attacker may have an opening to inject previously recorded measurements, asserting what is replayed as being current. When sensitive information is being transmitted to a destination device through a network, network traffic should not be sent through comprised network nodes (e.g., hacked or captured nodes) to prevent leakage of or tampering with the sensitive information. However, traditional protections and link encryption are ineffectual to ensure that each router in the end to end path is not compromised specially when an attacker gains root access to a device via some exploit.

In particular embodiments, a first network node (e.g., a network element 120 acting as a BGP-LS speaker) may be configured to communicate using the BGP-LS routing protocol. The first network node may receive a BGP message (e.g., a BGP Update message 200) that includes an attestation token 160 from a second network node (e.g., another network element 120). The attestation token 160 may be for proving that the second network node is in a known safe state. The first network node may determine that the attestation token is valid for the second network node at a current time. The first network node may compute a trust level for the second network node based at least on the received attestation token 160. The first network node may send a BGP-LS Update message 200 that includes the trust level (e.g., within security-level TLV 720) and the attestation token 160 (e.g., within attestation-capability TLV 710) for the second node to another device such as RR 130. The trust level for the first link and the trust level for the prefixes may be used by the network nodes in the network to compute a routing table of the network.

As described herein, verifiable evidence of device tampering (e.g., canary stamps) may be appended to interactions based on existing communication protocols. This may give evidence receivers the option of evaluating trustworthiness of the network device and reacting accordingly. For example, the evidence receiver may determine that it no longer trusts the network device and adjusts network policy to mitigate possible damage or potential security threats. Dedicated crypto-processors such as a TPM may take necessary measurements to attest the identity of a device and its running binaries. These measurements may include detecting evidence which indicates that the device is in a known safe state. However, a receiver may need to certify the evidence as fresh because, without a guarantee of freshness, an attacker may inject previously recorded measurements to make the receiver to assert what is replayed as being current.

Traditional systems and methods may identify or detect the replaying of old evidence via a nonce. For example, a nonce could be a random number provided by the entity making the request. This nonce may be passed into the TPM which may generate results including a signature based on the nonce which could not have been generated without providing that nonce. However, the nonce-based method may rely on the transactional challenge/response interaction model. In other words, the nonce-based method may not work with unidirectional communications originating from the attesting device. For example, a nonce may not work with an asynchronous push, multicast, broadcast messages, etc.

Particular embodiments of this disclosure may perform a unidirectional attestation which is applicable to, for example, an asynchronous push, multicast, broadcast messages, etc., for the authentication of the corresponding devices in conjunction with corresponding binaries. Particular embodiments may enable a communication platform to assess whether the peer platforms are trustworthy. For example, the system may perform a detection of invalid attestations that can trigger alarms/events reduction of network access from a suspect device or can become a part of Admission Control (e.g., IEEE 802.1X). The communication platforms may be capable of supporting the unidirectional attestation mechanism. As an alternative approach for attesting freshness, particular embodiments of the system may generate a token which may allow external entities to validate freshness of asserted data based on the state of internal counters within the TPM. The token may allow the replay attacks to be detected without a nonce and make it possible for the attestation for asynchronous push, multicast, broadcast, etc. The token or signed measurement may be referred as a canary stamp since a token or signed measurement may provide authenticity like a stamp and may be used as an indicator of an early sign of trouble. Particular embodiments of the system may combine the token or signed measurement with TPM-integrated capabilities aimed at verifying that valid binary processes are running. The TMP-integrated capabilities may include, for example, but are not limited to, trusted execution environments (TEE) which may provide runtime malware protections and authenticated code modules (ACM) which may ensure that only digitally signed code modules can be loaded into a CPU. Particular embodiments of this disclosure may be implemented within a communication platform (e.g., a proprietary platform) or/and across multiple communication platforms (e.g., proprietary platforms and third-party platforms).

Particular embodiments of the system provide an advantageous technical solution for communication platforms to attest authenticity and allow a common unidirectional attestation framework to be applied across existing networking hardware as well as virtual routers. Particular embodiments of this disclosure may be applicable to, for example, but not limited to, Cisco Secure Boot, Linux Integrity Measurement Architecture (IMA), Intel's Trusted Execution Technology (TXT), etc., and may enable these platforms to validate that a processor is running known software with valid chain of binary signatures. Particular embodiments of the system may provide defining requirements for the placement of different types of signed measurements (e.g., token or stamps) while allowing receivers to evaluate potential trustworthiness of attested information. Particular embodiments of the system may support controller-based evaluation of signed measurement (e.g., token or stamps) which includes subscription-based mechanisms to incrementally push information/evidence to be verified or/and beachhead use cases and platforms.

TPM functionality may be embedded in a wide variety of devices including mobile phones, PCs, routers, etc. While traditional TPM methods may enable a device to prove freshness in a replay to a response, these methods may not support unidirectional attestation. Particular embodiments of this disclosure may provide mechanisms for verifiable unidirectional attestation by creating and distributing a token. This token may link counters on an attesting device with one or more globally verifiable characteristics or parameters (e.g., a counter on a controller, a RADIUS server, or a time authority). Upon its creation, the token may be distributed freely to any number of receivers/verifiers. Upon receiving the token, a receiver may accept subsequently attested information (e.g., stamps) from a remote TPM and attest asynchronous push, multicast, or broadcast communications of a device. It is notable that, in this disclosure, the term "TPM" may be used as an umbrella term for the necessary functionality. The mechanisms described may be supported by one or more proprietary hardware and other hardware supporting the TPMv2 specification.

In particular embodiments, the system may create the initial token by extracting current counters from an attestee's TPM (e.g., either the local network element 120 or another network element 120), and hashing it with information from an external TPM. As a result, the system may generate a non-spoofable token which binds continuously incrementing counters on an attestee with some known external state. In particular embodiments, any resetting of the TPM counters may be visible in any subsequent TPM queries. Any restarting of platform may be exposed in subsequent TPM queries. Within these bounds of reset and restart, the TPM's counter time-tick may keep continuous increments. Therefore, the push of attestee TPM information which includes these three counters may be known to have occurred subsequently to any previously received measurement. On the other hand, if the reset and restart counters have not changed, the incremental time since any previous measurement may also be known. In particular embodiments, the system may validate device information asserted from outside the TPM's program configuration registers (PCR). The majority of information needing to be trusted by network peers may not be contained within the TPM's PCR. Particular embodiments of the system may provide indirect methods of validating that a device has not been compromised based on the data or processes of exiting systems or platforms.

Particular embodiments of the system may provide integration solutions with both STO's integrity verification (IV) solution and, where applicable, integrity measurement architecture (IMA). The system may provide combination solutions that enable validating that acceptable binaries are currently loaded on a peer communication system or platform. Particular embodiments of the system may allow the receiver to receive stamps and verify the information without supplementary evidence being sent with the stamp. For non-controller-based implementations, the system may not require that the verification steps occur on the receiver.

A network may only be a secure as its weakest links. Information sent from a first device to a second device on the network may pass through multiple intermediary nodes or devices (e.g., routers, network controllers, etc.) before it reaches the target device. It is vitally important that said information, especially when it includes sensitive material, should not be sent through compromised network nodes (e.g., hacked or captured nodes) to prevent leakage of or tampering with the sensitive information. However, as network size and complexity increase, the potential number of attack vectors for an attacker to exploit also grows. It may be difficult to determine with certainty whether each individual node through which an arbitrary piece of information may pass is secured without having a dramatic effect on the performance of the network. Moreover, if an attacker gains root access to a device (e.g., via some previously undetected exploit), traditional protections and link (e.g., in-transit) encryption may prove ineffectual at protecting any sensitive information.

Particular embodiments may apply attestation in the context of security management at a network-level to determine in real-time whether a node in a network should be trusted. This disclosure introduces an asynchronous, unidirectional time-based variant of attestation that may allow other nodes in a network to reliably ascertain if a source that is routing information has been compromised. As previously discussed, the token used in this variant of attestation may be referred to as a "canary stamp" as it positively marks data as it transitions through the network and can indicate on a front-line basis whether any security problems may exist within the network or within a given node.

In particular embodiments, the attestation token may be employed within the BGP-LS routing protocol. Attestation tokens (e.g., canary stamps) may be used in the BGP-LS routing protocol to augment the capabilities of the standard protocol allowing the network to build a "trusted network topology" that comprises known secured nodes. When using canary stamps to build a trusted network topology, a BGP-LS speaker network element 120 performs several interrelated functions. When the BGP-LS speaker network element 120 is originating information in BGP-LS corresponding to the underlying ISIS and OSPF topology, it translates the TLVs into corresponding TLVs in BGP-LS (e.g., attestation-capability TLV 710 and security-level TLV 720) once the verification has been successful in the IGP process on the BGP-LS speaker network element 120. This enables transition of trustworthiness and attestation information from the IGPs into BGP-LS. When the BGP-LS speaker network element 120 is originating information into BGP-LS corresponding to the local node when running BGP as the only routing protocol (e.g. in data-centers running BGP-only fabric, for inter-AS links, or for networks in general which use BGP as a hop-by-hop routing protocol), then the BGP-LS speaker network element 120 provides the attestation information of the node directly.

Regardless of the source of information (e.g., either the local node or external node), BGP-LS enables advertisement of topology information to applications such as a PCE that is centralized or distributed or to any application/controller that functions as BGP-LS consumer. Carrying attestation information in BGP-LS enables a consumer application to perform verification of the attestation of information from nodes in the network and to establish their trustworthiness. This enables an application like a PCE/controller to implement policies for services that require an enhanced level of security through the network. In addition, some embodiments leverage the attestation capability negotiation of the base BGP protocol for the BGP session management when enabled with BGP-LS AFI/SAFI. Furthermore, an attestation router capability associated with a Node NLRI allows the BGP-LS speaker network element 120 to advertise its support for attestation procedures. This can be leveraged for secured interactions and for establishing trustworthiness between the node and BGP-LS consumer applications/controllers.

In some embodiments, a BGP-LS originator (i.e., a node originating information into BGP-LS such as a BGP-LS speaker network element 120B) may, in some embodiments, advertise the BGP attestation attribute that includes the information provided by the local router's trusted computing infrastructure with every Link-State NLRI 210 that it originates. These NLRIs will be propagated as usual and subject to verification and transition of trustworthiness. In some embodiments, a BGP-LS originator advertises the trustworthiness of the Link-State NLRI 210 objects using the security-level TLV 720 in the BGP-LS Attribute 220 associated with those NLRIs. The trustworthiness is determined based on the result of the verification of the attestation TLV by the originating BGP node either at the IGP process level on that node or based on local policy for the node's own information.

As described above in reference to FIG. 4, there are multiple Link-State NLRI types whose trustworthiness can be advertised to a consumer application/controller of the BGP-LS information. For nodes, the Node NLRI is used (i.e., NLRI type="1"). For links/adjacency, the Link NLRI is used (i.e., NLRI type="2"). For prefixes, the IPV4/IPv6 Prefix NLRI is used (i.e., NLRI type="3" or "4"). For SRTE or RSVP-TE Policies, the TE Policy NLRI may be used.

In a data center using BGP as the only routing protocol, BGP-LS is typically used for advertisement of the topology information to a controller. The topology can also include the server/compute nodes and virtual network functions connected to the top-of-the-rack (TOR) switch. BGP-LS peers can be also set up from these compute devices to the TOR for learning the topology information such as prefixes and service information of the servers/hosts. Alternately, the TOR can learn of the topology information from the hosts via some other provisioning mechanism and advertise it to a controller via BGP-LS. The trustworthiness of the host/compute information this is propagated via BGP-LS can be used by a controller to influence policy for steering of sensitive services and flows from the host via secure paths through the data center fabric and over the WAN using technology such as Segment Routing.

In some embodiments, BGP-LS objects are advertised as Link-State NLRI 210 objects that carry the description of the object, and the BGP-LS Attribute 220 associated with that Link-State NLRI carries the information about the objects. Both the Link-State NLRI 210 and BGP-LS Attribute 220 carry TLVs. The BGP-LS information is propagated via BGP similar to other BGP updates (e.g., in a BGP Update message 200). A consumer of the BGP-LS information receives these Link-State objects and their attributes from a BGP speaker (e.g., a network element 120).

Using the above described TLVs (i.e., attestation-capability TLV 710 and security-level TLV 720), a network enforcing the BGP-LS routing protocol may implement attestations such as canary stamps. In some embodiments, the nodes of a network may be further configured with functions that reflect an augmentation and improvement on traditional BGP-LS routing protocol functions. Many of the functions, as described in this disclosure, may be interrelated and may rely on other nodes in the network supporting the capability as well in order to function successfully. Several of the functions made available by the attestation-capability TLV 710 and security-level TLV 720 are explained in more detail below.

Referring back to FIG. 1, network elements 120 may be configured to advertise their attestation capability to other network elements 120. Through this function, a network element 120 may be capable of positively announcing to other nodes of network 100 that it is capable of supporting attestation procedures (e.g., canary stamps) in the BGP routing protocol. In some embodiments a network element 120 may further announce particular functions that it supports or variants of attestation capabilities.

In particular embodiments, a network element 120 may be configured to advertise an Attestation TLV such as attestation-capability TLV 710. Each network element 120 may include a trusted computing infrastructure (e.g., a TPM or other crypto-processor) and may append attestation information provided by the trusted computing infrastructure to BGP messages it sends, for example, to a BGP-LS speaker network element 120 (e.g., network element 120B). A BGP-LS speaker network element 120 (e.g., network element 120B) may then encode the received attestation information from network elements 120 in a BGP-LS signaling message such as BGP Update message 200. In some embodiments, BGP-LS speaker network element 120 may additionally or alternatively encode attestation information from its trusted computing infrastructure in a BGP-LS signaling message.

In particular embodiments, a network element 120 may be configured to validate Attestation TLVs received from other network elements 120. The receiving network element 120 may be further configured to take action based on the status of the validation according to a specified policy provided to the network node. For example, a network element 120 may be configured to advertise the trustworthiness of a link or adjacency with a neighboring node using security-level TLV 720. In some embodiments, security-level TLV 720 may include information to indicate a trustworthiness level of that neighboring node. As an example, network element 120B may validate a canary stamp received in an attestation-capability TLV 710 from a neighboring network element 120. The attestation-capability TLV 710 may fail the validation and network element 120B may determine to refuse to acknowledge the neighboring network element 120, as it has determined that it is not trustworthy (e.g., it may be executing unexpected or unsigned code, or it may otherwise show evidence of tampering). Network element 120B may further advertise that it has determined that the neighboring network element 120 is not trustworthy. For example, network element 120B may advertise its conclusions to RR 130 using BGP-LS link 150. This may reduce the likelihood of other nodes in the network sending sensitive information to the untrustworthy neighboring network element 120.

In particular embodiments, a network element 120 such as network element 120B may compute a trust level for a network element 120 based on a received attestation token and then encode the trust level in security-level TLV 720. As an example and not by way of limitation, network element 120B may set a maximum value to the trust level for network element 120A if it determines that the attestation token for network element 120A is valid at the current time. As another example and not by way of limitation, network element 120B may set a minimum value to the trust level for network element 120A if it determines that the attestation token for network element 120A is not valid at the current time. The computed trust level may then be included in security-level TLV 720. Although this disclosure describes computing a trust level in a particular manner, this disclosure contemplates computing a trust level for a link in any suitable manner.

FIG. 8 illustrates an example method 800 for applying attestation to the BGP-LS routing protocol. In some embodiments, method 800 may be performed by any apparatus of a BGP-LS network. Method 800 may begin at step 810 where an attestation token is received from a first component in a network. In some embodiments, the attestation token may be attestation 160 as described herein. In some embodiments, the attestation token may be received at a network node such as a BGP-LS originator. In some embodiments, the first component is a crypto-processor or other TPM of the BGP-LS originator. In other embodiments, the first component is a crypto-processor or other TPM of another node of the BGP-LS environment (e.g., another network node).

At step 820, method 800 encodes the attestation token received in step 810 in a BGP-LS signaling message. In some embodiments, this step includes forming a TLV that is included in a BGP-LS attribute associated with a Node NLRI. In some embodiments, this step includes forming a TLV that is included in a BGP-LS attribute associated with a Link NLRI. In some embodiments, the TLV of this step is attestation-capability TLV 710 or security-level TLV 720 described herein. In some embodiments, the BGP-LS signaling message of this step is a BGP Update message.

At step 830, method 800 sends the BGP-LS signaling message with the encoded attestation token to a second component of the BGP-LS environment. In some embodiments, the second component is a route reflector node, a controller, or any other appropriate network node or device in the BGP-LS network. After step 830, method 800 may end.

Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for applying attestation to the BGP-LS routing protocol including the particular steps of the method of FIG. 8, this disclosure contemplates any suitable method for applying attestation to the BGP-LS routing protocol including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular

The invention claimed is:

1. An apparatus of a Border Gateway Protocol-Link State (BGP-LS) environment, the apparatus comprising:
a crypto-processor;
one or more processors; and
one or more computer-readable non-transitory storage media coupled to the one or more processors and comprising instructions operable when executed by the one or more processors to cause the one or more processors to perform operations comprising:
receiving an attestation token generated by the crypto-processor;
generating a determination of whether the attestation token is valid;
computing a trust level for a first component based at least on the determination of whether the attestation token is valid;
encoding a Node Network Layer Reachability Information (NLRI) type, the trust level and the attestation token in a BGP-LS signaling message, wherein the trust level represents a level of trustworthiness of the NLRI type; and
sending the BGP-LS signaling message with the trust level and the encoded attestation token to a second component of the BGP-LS environment.

2. The apparatus of claim 1, wherein:
the apparatus of the BGP-LS environment comprises a BGP-LS originator.

3. The apparatus of claim 1, wherein encoding the attestation token in the BGP-LS signaling message comprises forming a Type-Length-Value (TLV) that is included in a BGP-LS attribute associated with a Node Network Layer Reachability Information (NLRI).

4. The apparatus of claim 1, wherein encoding the attestation token in the BGP-LS signaling message comprises forming a TLV that is included in a BGP-LS attribute associated with a Link NLRI.

5. The apparatus of claim 1, wherein the BGP-LS signaling message comprises a BGP Update message.

6. The apparatus of claim 1, wherein the second component of the BGP-LS environment is a route reflector (RR).

7. The apparatus of claim 1, wherein the attestation token further indicates whether or not the apparatus is running software with a valid chain of binary signatures.

8. The apparatus of claim 1, the operations further comprising:
computing a trust level using the attestation token; and
encoding the trust level in the BGP-LS signaling message.

9. The apparatus of claim 1, wherein:
the attestation token is encoded in a first TLV of the BGP-LS signaling message;
the trust level is encoded in a second TLV of the BGP-LS signaling message; and
the NLRI type of the BGP-LS signaling message represents:
a node;
a link;
an IPV4; or
an IPV6.

10. A method by an apparatus of a Border Gateway Protocol-Link State (BGP-LS) environment, the method comprising:
receiving an attestation token generated by the apparatus;
generating a determination of whether the attestation token is valid;
computing a trust level for a first component based at least on the determination of whether the attestation token is valid;
encoding a Node Network Layer Reachability Information (NLRI) type, the trust level and the attestation token in a BGP-LS signaling message, wherein the trust level represents a level of trustworthiness of the NLRI type; and
sending the BGP-LS signaling message with the trust level and the encoded attestation token to a second component of the BGP-LS environment.

11. The method of claim 10, wherein:
the apparatus of the BGP-LS environment comprises a BGP-LS originator.

12. The method of claim 10, wherein encoding the attestation token in the BGP-LS signaling message comprises forming a Type-Length-Value (TLV) that is included in a BGP-LS attribute associated with a Node Network Layer Reachability Information (NLRI).

13. The method of claim 10, wherein encoding the attestation token in the BGP-LS signaling message comprises forming a TLV that is included in a BGP-LS attribute associated with a Link NLRI.

14. The method of claim 10, wherein the BGP-LS signaling message comprises a BGP Update message.

15. The method of claim 10, wherein the second component of the BGP-LS environment is a route reflector (RR).

16. One or more computer-readable non-transitory storage media embodying software that is operable when executed to cause an apparatus of a Border Gateway Protocol-Link State (BGP-LS) environment to:
receive an attestation token from a crypto-processor of the apparatus of the BGP-LS environment;
generate a determination of whether the attestation token is valid;
compute a trust level for a first component based at least on the determination of whether the attestation token is valid;
encode a Node Network Layer Reachability Information (NLRI) type, the trust level and the attestation token in a BGP-LS signaling message, wherein the trust level represents a level of trustworthiness of the NLRI type; and
send the BGP-LS signaling message with the trust level and the encoded attestation token to a second component of the BGP-LS environment.

17. The one or more computer-readable non-transitory storage media of claim 16, wherein:
the apparatus of the BGP-LS environment comprises a BGP-LS originator.

18. The one or more computer-readable non-transitory storage media of claim 16, wherein encoding the attestation token in the BGP-LS signaling message comprises forming a Type-Length-Value (TLV) that is included in a BGP-LS attribute associated with a Node Network Layer Reachability Information (NLRI).

19. The one or more computer-readable non-transitory storage media of claim 16, wherein encoding the attestation token in the BGP-LS signaling message comprises forming a TLV that is included in a BGP-LS attribute associated with a Link NLRI.

20. The one or more computer-readable non-transitory storage media of claim 16, wherein the BGP-LS signaling message comprises a BGP Update message.

* * * * *